United States Patent
Pinsky et al.

(10) Patent No.: US 7,185,292 B2
(45) Date of Patent: Feb. 27, 2007

(54) SCREEN CONTROLLER AND METHOD THEREFOR

(75) Inventors: Maria Pinsky, Colorado Springs, CO (US); Jessica Kraemer, Monument, CO (US); Lee Macklin, Colorado Springs, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 666 days.

(21) Appl. No.: 10/216,799

(22) Filed: Aug. 13, 2002

(65) Prior Publication Data

US 2004/0032434 A1    Feb. 19, 2004

(51) Int. Cl.
*G06F 13/00* (2006.01)
*G06F 15/00* (2006.01)

(52) U.S. Cl. .................... 715/867; 715/778
(58) Field of Classification Search ............. 715/764, 715/716, 765, 854, 719, 722, 723, 736, 738, 715/867, 778, 851
See application file for complete search history.

(56) References Cited

U.S. PATENT DOCUMENTS

| 6,434,621 | B1 * | 8/2002 | Pezzillo et al. | 709/231 |
| 6,757,682 | B1 * | 6/2004 | Naimark et al. | 707/10 |
| 6,775,835 | B1 * | 8/2004 | Ahmad et al. | 719/331 |
| 2005/0033806 | A1 * | 2/2005 | Harvey et al. | 709/204 |

* cited by examiner

*Primary Examiner*—Cao (Kevin) Nguyen (57) ABSTRACT

A screen controller for providing the display of images on a computer display in a programmatic manner, the images in one example originating from web sites of the Internet providing real time images from web cameras. In one embodiment, a method for displaying images on a display provides a user with one or more web sites to select, each web site having an image therein. The user's selection of the one or more web sites are stored, and the user is provided with a control to specify a time range during which each image of each web site is to be accessed. During the time range specified, the web site is accessed to obtain the image, and the image is displayed on the display.

21 Claims, 5 Drawing Sheets

SCREEN CONTROLLER AND METHOD THEREFOR

TECHNICAL FIELD

This invention relates, in general, to a computer screen controller, and more particularly, to a screen controller for controlling a display of images obtained from web sites, such as web sites that have cameras which provide images accessible over the Internet.

BACKGROUND

Personal computers and workstations are typically provided with display screens which, during periods of inactivity, activate screen savers which typically display an image or a blank screen on the display. These displays are typically static in nature, in that they are either of a fixed image that is moved around the screen (such as a text string "I'm away from my computer" or a logo such as "Microsoft Windows"™, or a pseudo-random computer generated display such as a bouncing ball or a graphically generated moving maze, or the like.

As recognized by the present inventors, what is needed is a screen controller for providing a display of images, such as real time images obtained from "web cameras" of Internet web sites, for a computer display in a programmatic manner—either during a screen saver mode or to a display during normal operations if desired by the user.

It is against this background that various embodiments of the present invention were developed.

SUMMARY

In light of the above and according to one broad aspect of one embodiment of the invention, disclosed herein is a screen controller for providing a display of images on a computer display in a programmatic manner, the images in one example originating from web sites of the Internet that provide real time images from web cameras.

According to one broad aspect of one embodiment of the invention, disclosed herein is a method for displaying images on a display of a computer. In one embodiment, the method includes providing for a selection of a web site having an image associated therewith; providing a control to specify a time range for accessing the image; during the time range specified, accessing the web site to obtain the image; and displaying the image on the display. In this manner, images from web cams may be accessed at certain times of day, under program control, for display in the display of the computing system.

In another embodiment, a control may be provided to specify a duration time for displaying the image, wherein the displaying operation displays the image on the display for the specified duration of time. Further, a control may be provided to specify a refresh frequency for refreshing the image, wherein based on the refresh frequency, the accessing operation accesses the web site to obtain the image. In another embodiment, a display size control is provided to specify whether the image is displayed in a full screen of the display, wherein based on the display size control, the displaying operation displays the image in a full screen or in a small-sized window. A mode control may also be provided to specify whether the image is displayed in a screen-saver mode, wherein based on the mode control, the displaying operation displays the image when the computer is in the screen saver mode or in a normal mode.

According to another broad aspect of one embodiment of the invention, disclosed herein is a screen controller including a module for selecting a web site having an image associated therewith; a control to specify a time range for accessing the image; a module for accessing the web site to obtain the image during the time range specified; and a module for displaying the image on the display. The screen controller may also include a control to specify a duration time for displaying the image, wherein the image is displayed on the display for the specified duration of time. In one example, the screen controller includes a control to specify a refresh frequency to for refreshing the image, wherein based on the refresh frequency, the web site is accessed to obtain the image.

In another embodiment, the screen controller includes a size control to specify whether the image is displayed in a full screen of the display, wherein based on the size control, the image is displayed in a full screen or small-sized window. The screen controller may also include a mode control to specify whether the image is displayed in a screen-saver mode, wherein based on the mode control, the image is displayed when the computer is in the screen saver mode or in a normal operating mode (i.e., non-screen saver mode).

According to another broad aspect of one embodiment of the invention, disclosed herein is a computing system including a computer, a display, a wireless transmitter coupled with the computer for transmitting a wireless signal, a wireless receiver coupled with the display for receiving said wireless signal, and a screen controller. In one embodiment, the screen controller includes a module for selecting a web site having an image associated therewith; a control to specify a time range for accessing the image; a module for accessing the web site to obtain the image during the time range specified; and a module for transmitting as the wireless signal a data signal corresponding to the image so that the image is displayed on the display. Due to the wireless communications between the computer, screen controller, and the display, images from the web sites may be displayed on the display positioned remotely from the computer. In one example, the display is a thin screen display mountable on a wall.

The foregoing and other features, utilities and advantages of the invention will be apparent from the following more particular description of various embodiments of the invention as illustrated in the accompanying drawings and claims.

DETAILED DESCRIPTION

In accordance with various embodiments of the present invention, disclosed herein is a screen controller, and methods therefore, for providing images to be controllably displayed on a computer display, either during normal operations or during a screen saver mode. The images may include real-time images, such as images that are provided by one or more web sites of a network such as the Internet, or by other sources of graphical images as selected by a user.

For instance, various web sites on the Internet are provided with cameras, commonly known as "web cams," which monitor and provide graphical images of particular locations. Web cams may be located at various locations such as beaches, mountains, cities, or other locations which are desired by users to periodically view. In accordance with an embodiment of the present invention, the screen controller provides a mechanism for a user to programmatically control and cycle between particular selected images and/or web cams for display on the user's computer display.

Figure 1:
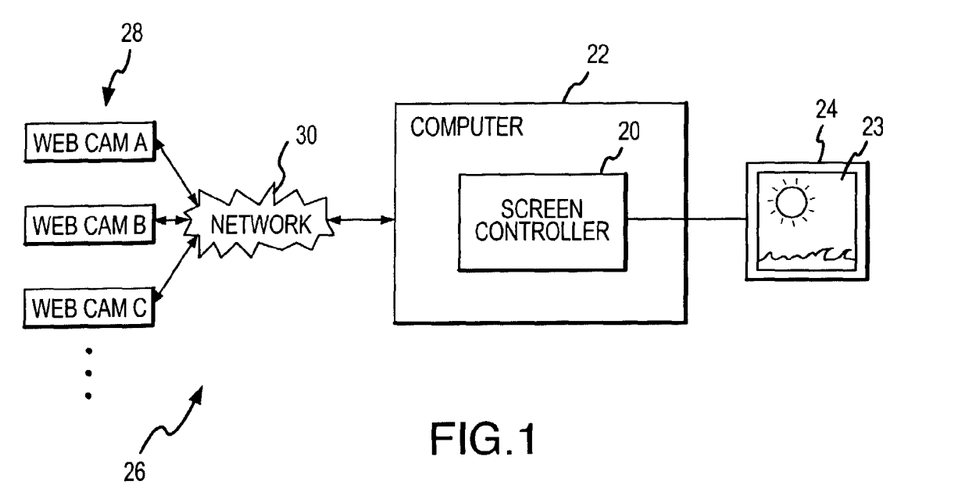
FIG. 1 illustrates a block diagram of one embodiment of the present invention, wherein a computer is provided with a screen controller to control the display of images on a display.

FIG. 1 illustrates a screen controller 20 operating within a user's computer 22, the screen controller providing control of graphic images 23 displayed upon a display 24 of the computer system 26. As will be explained below, the screen controller 20 permits a user to select and programmatically control the display 24 of the computer 22 such that the display 24 displays images derived from Internet web sites 28 of a network 30, such as the Internet, in a programmatic manner.

Figure 2:
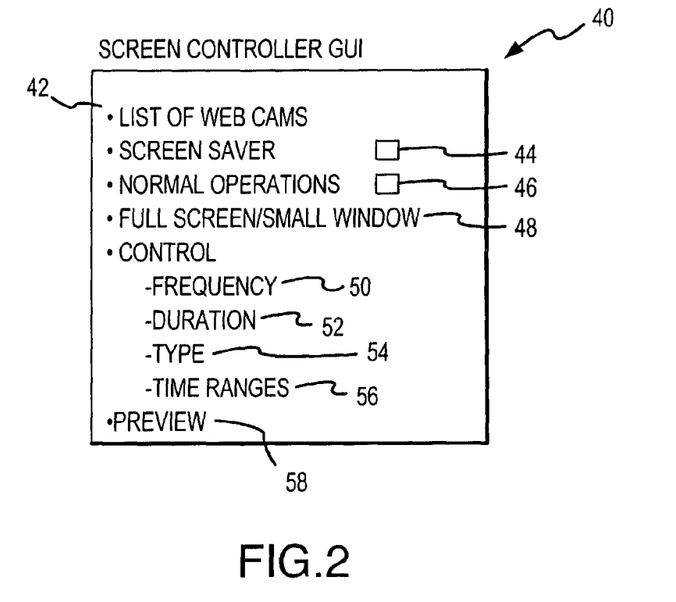
FIG. 2 illustrates a sample display screen of a screen controller graphical user interface, in accordance with one embodiment of the present invention.
Figure 3:
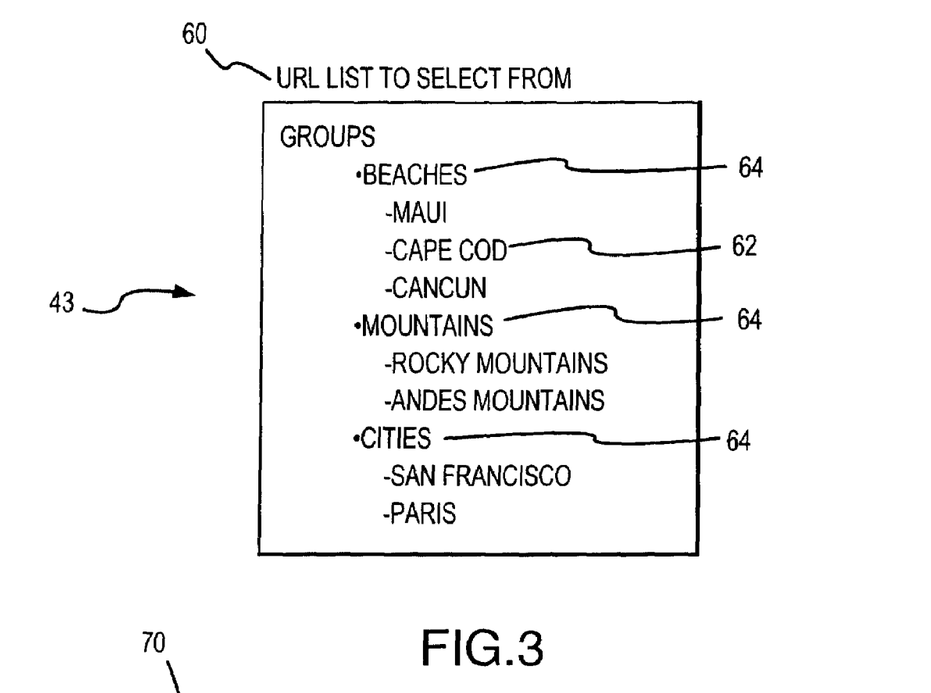
FIG. 3 illustrates a sample display screen of a list of Internet web site addresses (URLs), in accordance with one embodiment of the present invention.
Figure 4:
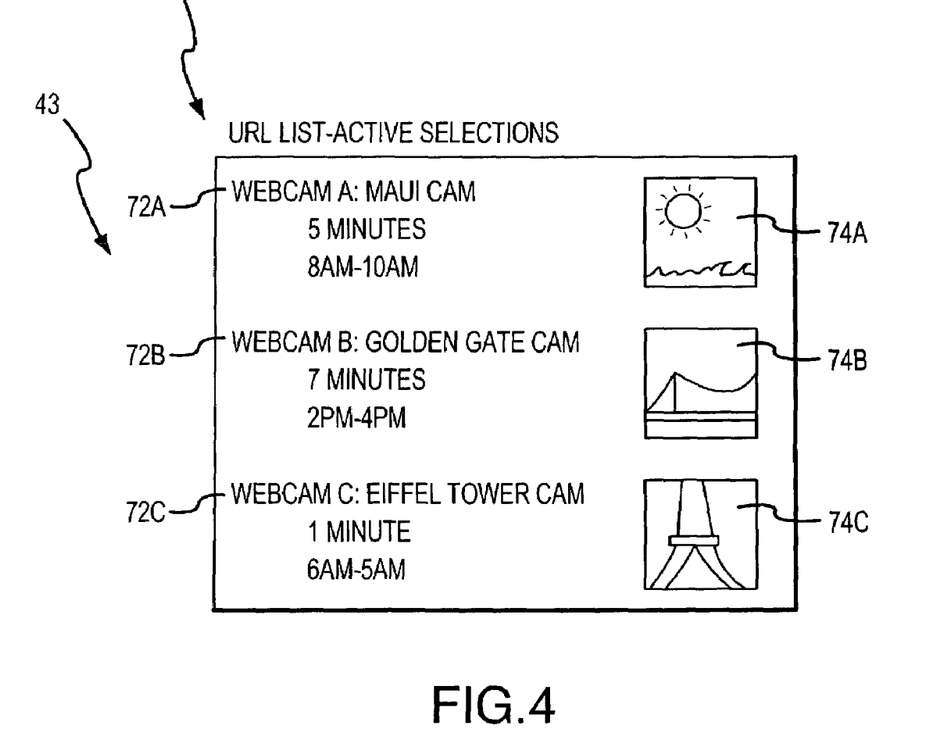
FIG. 4 illustrates a sample display screen of a list of active selections of web sites, in accordance with one embodiment of the present invention.

Referring now to FIG. 2, one example of a graphical user interface (GUI) 40 for a screen controller 20 having a plurality of controls 42–58 is illustrated, in accordance with one embodiment of the present invention. As shown in FIG. 2, the graphical user interface 40 may provide the user with control or link 42 to a list 43 of web cams (or addresses/URLs thereof). The list 43 may include a list of web cam/image source addresses which the user can access, add, delete, or review (such as shown in FIG. 3) and/or may include a list of web cams/image sources which the user has already selected as active selections (such as shown in FIG. 4).

Further in FIG. 2, the graphical user interface 40 may provide the user with a control 44 to activate the screen controller 20 in a screen saver mode, (i.e., wherein the screen controller 20 is activated only after the computer 22 has been inactive for a fixed period of time such as five minutes) or a control 46 to activate the screen controller 20 during normal operations (for example, wherein a window, such as reduced size window, with the images 23 may be provided on the user's display 24). Further, the graphical user interface 40 can also provide the user with a control 48 to select a full screen or small window mode, the full screen mode providing a full screen display of the graphical images 23, while the small window mode provides a small window display sizable by the user to display the graphical images 23 therein.

In accordance with one embodiment of the present invention, the graphical user interface 40 may further provide one or more user controls 50–56 to govern the display of images 23. In one embodiment, a control 50 may be provided so that the user may control the frequency at which images are retrieved, updated, or refreshed from particular sources 28. For instance, if a user has selected a particular web cam of a web site to provide graphical images, the user can set the frequency for retrieving an image from a particular web cam, such as one refresh every 2 minutes in one example. The rate at which an image is refreshed may be set to a higher rate in order that the refresh operation be a low priority operation in the computing system, such as one refresh every 5 minutes. Where a user desires that the display show images as they change more rapidly, the refresh rate or frequency may be set to a faster rate, such as one refresh per 5 seconds. In another example, where a web cam 28 involves streaming graphic images, the refresh rate or update frequency may be related to the transmission rate of the web cam.

A control 52 may also be provided which governs a duration or period for which a particular image or set of images 23 from a web cam 28 is to be displayed. For example, the user could select a time period for display of a selected graphical image source 28 to be a fixed period of time (i.e., display image for 30 seconds), or alternatively, to display an image for a pseudo-random amount of time, if desired. In one example, the duration control 52 controls the amount of time that an image (or update thereof) from a first web cam is displayed until an image from a second web cam is retrieved and displayed.

Further, the graphical user interface 40 may include a control 54 to provide the user with the ability to select the type of graphic image 23 to be displayed. In one embodiment, control 54 permits the user to select the particular web cams or other sources 28 of graphical images from which images 23 will be displayed in the display 24.

The graphical user interface 40 may also provide a control 56 to permit the user with the ability to control the time ranges during which particular image sources 28 are to be accessed and the associated images 23 to be displayed. For instance, if the user is in California but desires to see the sunrise in Hawaii and has selected a web cam of a beach in Hawaii, the user may select that graphical images from this web cam be displayed on the user's computer 22 during a particular time range such as from 8:00 a.m. to 10:00 a.m. The time ranges specified may be with reference to the local time zone of the user's computer, or may be with reference to the time zone of the web cam. In this manner, the user could set up that the screen controller 20 access a variety of images 23, from web cams or other source of images 28 located throughout the world, be displayed on the users computer during particular times or time ranges as dictated by the user through the graphical user interface 40 of FIG. 2.

The graphical user interface 40 of FIG. 2 may also have a control 58 to provide a preview function wherein the user can sample or preview how the display 24 would operate in the manner as established by the user through the controls 42–56 of the graphical user interface 40. This preview control 58 permits a user to sample the settings of the screen controller 20.

FIG. 3 illustrates an example of a list 60 of web site addresses/uniform resource locators (URLs) 62 of images from which a user can select. In one embodiment, group headings 64 of topics are created with the addresses 62 of the web cams or other sources 28 of graphical images 23 subcategorized using the group headings 64. As shown in FIG. 3 for instance, the headings 64 include "Beaches," "Mountains," and "Cities," and underneath each heading 64, a set of links or indicators 62 of web cams are listed. The user may create a list 60 of web sites using a browser as discussed with reference to FIG. 5. The headings 64 may be created by the user so that the web sites can be arranged as desired by the user. The control 42 of FIG. 2 would provide the user with the ability to view the list 60 of web sites/web cams, and/or to add, delete, or modify entries on the list 60.

In FIG. 4, an example of an active list 70 of web cams or image sources 72A, B, C is illustrated. In this example, it is assumed that the user has used the graphical user interface 40 of FIG. 2 to select three web cams 72A, B, C, as well used various controls 42–58 of the GUI 40 to specify the duration, frequency, and time ranges for display of the images of each web cam. In one embodiment, a thumbnail graphical image 74 A, B, C of each web cam 72A, B, C is provided.

For example in FIG. 4, web cam 72A is the "Maui" cam, and the user has established a duration of five minutes for displaying images from this web cam, to operate from the hours of 8:00 a.m. to 10:00 a.m. Web cam 72B is a "Golden Gate" cam, which has been established by the user to have a duration of seven minutes for displaying images from this web cam, operating from 2:00 p.m. to 4:00 p.m. Web cam 72C is the "Eiffel Tower" cam which the user has selected to have a duration of one minute for displaying images from this web cam, operating from 6:00 a.m. to 5:00 a.m.

Hence in the example of FIG. 4, from 8:00 am to 10:00 am, images will be displayed in the following manner: images from web cam 72A will be displayed for 5 minutes, then images from web cam 72C will be displayed for 1 minute—and this process will repeat. From 10:00 am to 2:00 pm, images from web cam 72C will be displayed. From 2:00 pm to 4:00 pm, images from web cam 72B will be displayed for 7 minutes, then images from web cam 72C will be displayed for 1 minute—and this process will repeat. From 4:00 pm to 5:00 am and from 6:00 am to 8:00 am, images from web cam 72C will be displayed, in this example.

Accordingly, it can be seen that through the use of the graphical user interface 40 of FIG. 2, the user can select a variety of web cams or other sources 28 of graphical images 23, establish a time duration that these images 23 are to be displayed on the display 24, as well as a time range during which a particular web cam 28 will be accessed. As the example of FIG. 4 illustrates, the screen controller 20 will cycle through the user-selected web cams 28, displaying each for the period/duration selected by the user, and displaying images from those web cams during the time periods selected by the user. Accordingly, the user can establish an intricate schedule of screen displays 23 from a plurality of sources 28 of graphical images.

Figure 5:
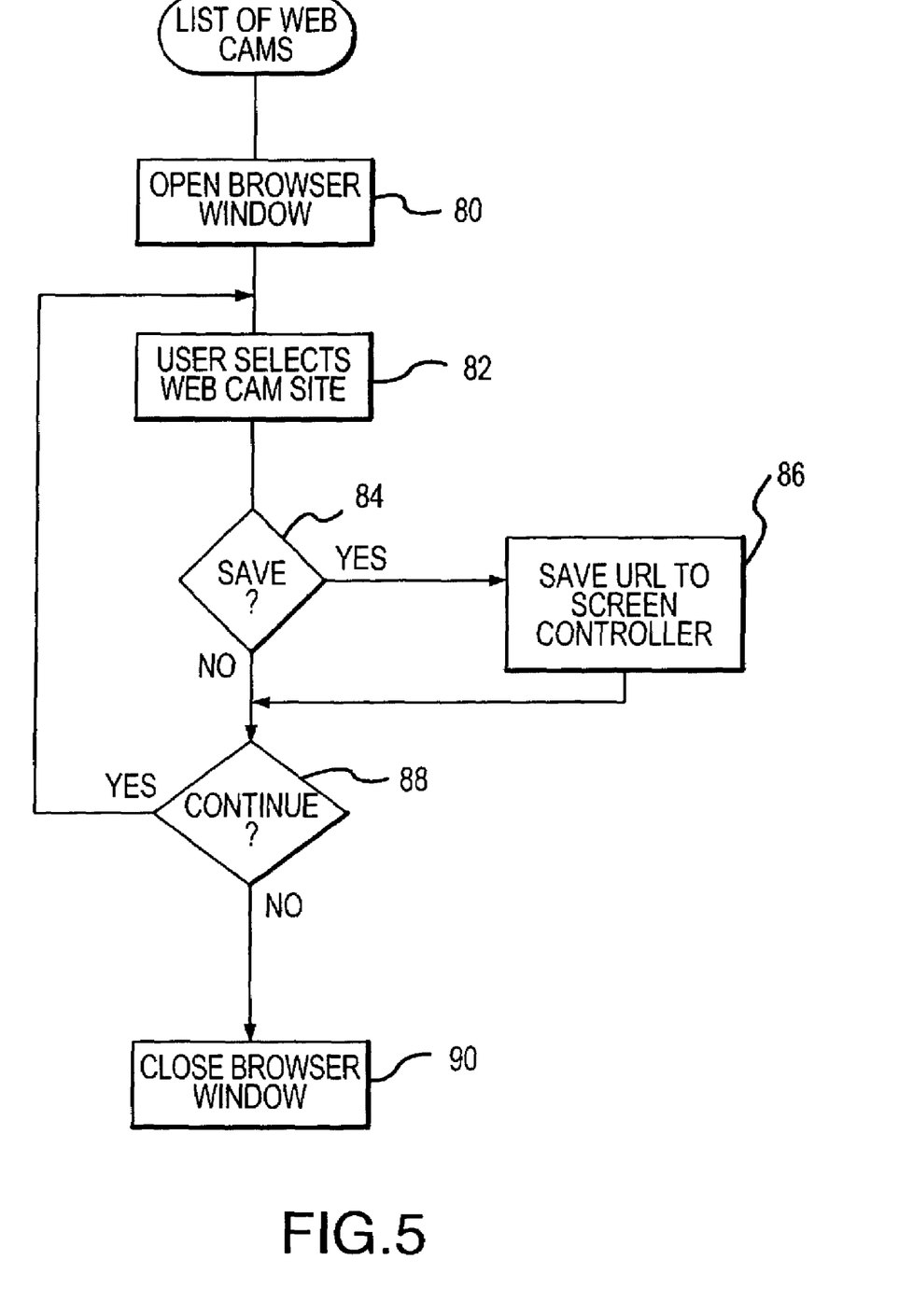
FIG. 5 illustrates one example of logical operations for selecting one or more web sites for storage by a screen controller, in accordance with one embodiment of the present invention.

FIG. 5 illustrates one example of logical operations for establishing a list 43 of web cams or sources 28 of images for the user to select from, in accordance with one embodiment of the present invention. At operation 80, a browser window is opened such that the user can access and view web sites from the Internet. The browser window may be provided, for example, using Microsoft's Internet Explorer™ or Netscape's Navigator™ or the like. At operation 82, the user selects a particular web site, which, in one example, includes a web cam site or other source of images or data. The user may view the graphical contents of the web cam (or other images therein) and, at operations 84–86 the user can save this particular web site so that it can be selected within the graphical user interface 40 of the screen controller 20 (FIG. 2). If the user selects a web site to be saved, then decision operation 84 passes control to operation 86, wherein the URL/address of the web site is saved, preferably to the screen controller. Operation 86 makes the URL/address of the desired web site accessible to the graphical user interface 40 of the screen controller 20 so that the web site can be listed in the listing 43 of FIG. 3 or FIG. 4 as desired. Decision operation 88 permits the user to continue to select and view other web sites, and when the user is completed, decision operation 88 passes control to operation 90, wherein the browser window is closed. Accordingly, it can be seen that the logical operations of FIG. 5 permit a user to view a variety of graphical images from one or more web sites or web cams, and the user may save desired web sites/web cams to be accessible by the GUI 40 of the screen controller 20.

Once the user has established the desired web cams/web sites 28 to select from, the user can then utilize the graphical user interface 40 of FIG. 2 to set up the desired display sequences for particular selected web cams/web sites, as well as the display time duration and time ranges thereof. In operation, the screen controller 20 cycles through the web sites 28 as dictated by the user's selections, and displays the images 23 accordingly.

Figure 6:
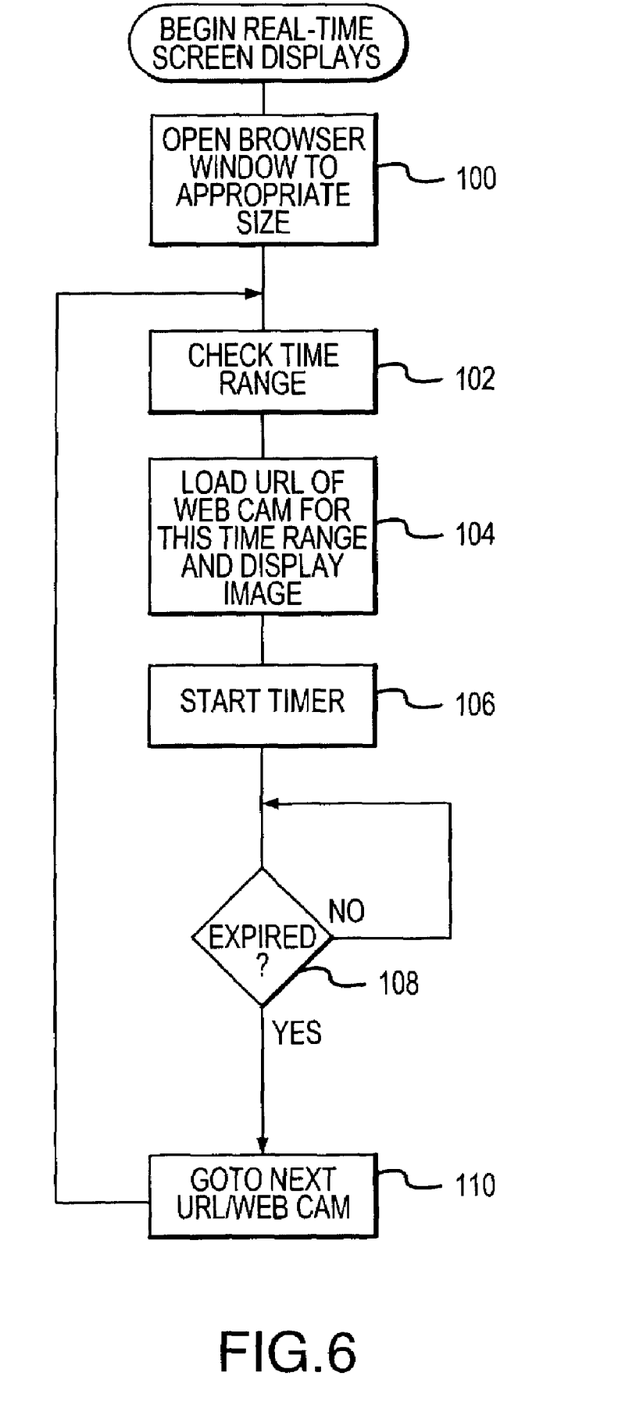
FIG. 6 illustrates one example of logical operations for displaying and cycling between images from web sites, in accordance with one embodiment of the present invention.

FIG. 6 shows one example of logical operations for displaying the images 23 based on the user input into the graphical user interface 40 of FIG. 2. Referring to FIG. 6, at operation 100, a display window, such as a browser window, is opened to the appropriate size. As shown in FIG. 2, controls 44, 46, 48 permit the user to specify that the display be either a full screen or a small window display, either as a screen saver or during normal operations as desired.

At operation 102 of FIG. 6, the specified time ranges associated with the web cam/images as set using control 56 are checked to ensure that only the appropriate graphical images are displayed during the user defined time ranges. In one embodiment, operation 102 compares the current time of the computer's clock to the user defined time range for a particular web cam/graphical image, and if the current time falls within the user defined time range, then the graphical image is eligible to be displayed during this cycle. If the current time does not fall within the user defined time range for a graphical image, then the graphical image is not displayed.

At operation 104, the URL/address of a web cam of the active list 70 for this time range is loaded into the browser and the image is displayed in the display screen. Because the images from a web cam may include real-time images, the display accordingly may include a real-time image. For instance, if operation 104 loads the URL/address for an "Eiffel Tower" web cam 72C, then the present image from the Eiffel Tower web cam is displayed on the display of the computer system. At operation 106, a timer is started, which is set to expire using the duration value provided by the user through control 52 into the graphical user interface of FIG. 2. For instance, if the user defined that the Eiffel Tower web cam be displayed for one minute, then the timer at operation 106 is preloaded to one minute and starts to run. Decision at operation 108 determines whether the timer has expired, and once the timer expired, control is passed to operation 110. Operation 110 goes to the next web cam or other source of images defined in the user's active list 70 (FIG. 4), and operations 102–110 are performed using images from the next web cam/image source.

It can be seen that the logical operations of FIG. 6 may be used to provide a variety of images 23 to be displayed on the display 24 of the computer system 26, wherein the cycling between the sources 28 of the images is under programmatic control based on data input by a user into a graphical user interface such as the GUI 40 of FIG. 2.

Figure 7:
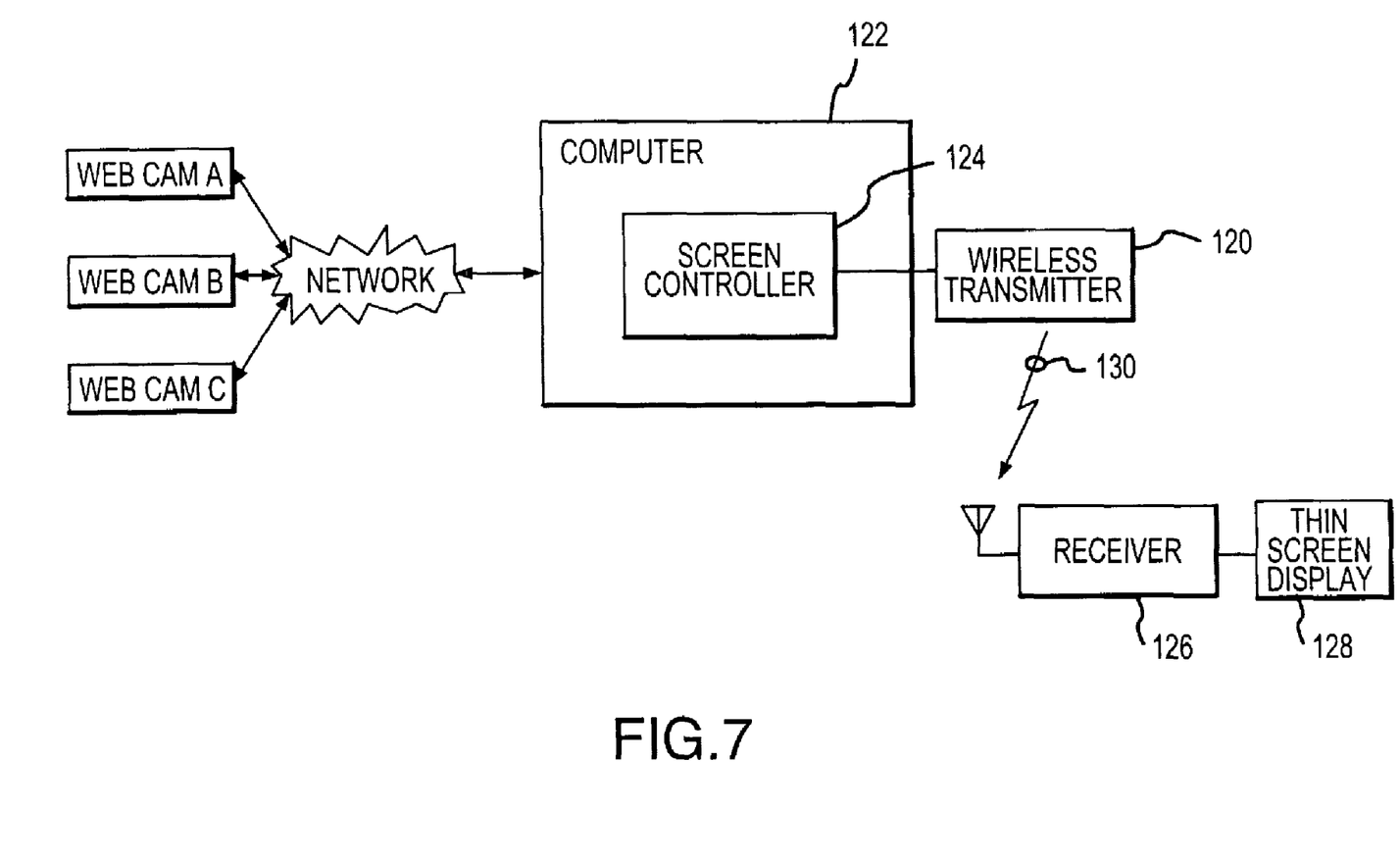
FIG. 7 illustrates an alternative embodiment wherein the system of FIG. 1 is provided with a wireless transmitter a wireless receiver to communicate data between the computer and the display, in accordance with one embodiment of the present invention.

Referring now to FIG. 7, an alternative embodiment of the system of FIG. 1 is shown. A wireless transmitter 120 is coupled with a computer 122 having a screen controller 124 operating therein, and a wireless receiver 126 is coupled with a display 128. In one embodiment, using the wireless transmitter 128, the computer 122 transmits a wireless signal 130 having graphical data. The receiver 126 receives the wireless signal 130 and provides the graphical data to the display 128. Because of the wireless communications link 130 between the computer 122 and the display 128, the display 128 can be placed remotely from the computer 122, which permits the display 128 to be positioned in a variety of locations. In one embodiment, the display 128 is a thin screen monitor or display which can be mounted on a wall such that the display 128 acts as a hanging wall picture. The display 128/receiver 126 receives wireless Internet graphical data from the computer 122 as programmatically selected by the user using the graphical user interface 40 of FIG. 2. In this manner, the display 128/receiver 126 could receive web cam graphical data of scenery from various parts of the world (i.e., a beach in the Tobago, the Swiss Alps, a waterfall in Hawaii, a sunrise on Catalina Island, etc.). The display 128 could provide continuously changing graphical images displayed in accordance with the parameters provided by the user in the graphical user interface 40 of FIG. 2.

It is understood that a wireless transceiver may be used in place of the wireless transmitter 120, and a wireless transceiver may be used in place of the wireless receiver 126, so as to provide two-way communications between the computer 122 and the display 128.

Various embodiments of the present invention may be embodied as computer program products including a computer usable medium and computer readable code embodied on said computer usable medium, the computer readable code including computer readable program code devices configured to cause the computer to perform or effect one or more of the operations described herein. Further, one or more of the operations, features, or controls described herein may be implemented using one or more modules adapted to operate in the computer system 26.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

The foregoing embodiments and examples are to be considered illustrative, rather than restrictive of the invention, and those modifications, which come within the meaning and range of equivalence of the claims, are to be included therein. While the invention has been particularly shown and described with reference to embodiments thereof, it will be understood by those skilled in the art that various other changes in the form and details may be made without departing from the spirit and scope of the invention.

We claim:

1. A method for displaying images on a display coupled with computer, the method comprising:
providing for a selection of a web site by a user having an image associated therewith;
providing a control that enables the user to specify a time range for accessing the image;
during the time range specified by the user, accessing the web site to obtain the image; and
displaying the image on the display for the user.

2. The method of claim 1, further comprising:
providing a control that enables the user to specify a duration time for displaying the image; and
wherein the displaying operation displays the image on the display for the user specified duration of time.

3. The method of claim 1, further comprising:
providing a control that enables the user to specify a refresh frequency for refreshing the image; and
wherein based on the refresh frequency specified by the user, the accessing operation accesses the web site to obtain the image.

4. The method of claim 1, further comprising:
providing a display size control that enables the user to specify whether the image is displayed in a full screen of the display; and
wherein based on the display size control, the displaying operation displays the image in a full screen.

5. The method of claim 1, wherein the accessing operation accesses a web site having a web cam.

6. The method of claim 1, further comprising:
providing a display size control that enables the user to specify whether the image is displayed in a small-sized window of the display; and
wherein based on the display size control, the displaying operation displays the image in a small-sized window.

7. The method of claim 1, further comprising:
providing a mode control that enables the user to specify whether the image is displayed in a screen-saver mode; and
wherein based on the mode control, the displaying operation displays the image when the computer is in the screen saver mode.

8. The method of claim 1, further comprising:
providing a mode control that enables the user to specify whether the image is displayed in a normal operating mode; and
wherein based on the mode control, the displaying operation displays the image when the computer is in the normal operating mode.

9. A screen controller, comprising:
a module for selecting a web site by a user having an image associated therewith;
a control that enables the user to specify a time range for accessing the image;
a module for accessing the web site to obtain the image during the time range specified; and
a module for displaying the image on the display for the user.

10. The screen controller of claim 9, further comprising:
a control that enables the user to specify a duration time for displaying the image, wherein the image is displayed on the display for the user specified duration of time.

11. The screen controller of claim 9, further comprising:
a control that enables the user to specify a refresh frequency to for refreshing the image, wherein based on the refresh frequency specified by the user, the web site is accessed to obtain the image.

12. The screen controller of claim 9, further comprising:
a size control that enables the user to specify whether the image is displayed in a full screen of the display, wherein based on the size control, the image is displayed in a full screen.

13. The screen controller of claim 9, wherein the web site accessed includes a web cam.

14. The screen controller of claim 9, further comprising:
a size control that enables the user to specify whether the image is displayed in a small-sized window of the display, wherein based on the size control, the image is displayed in a small-sized window.

15. The screen controller of claim 9, further comprising:
a mode control that enables the user to specify whether the image is displayed in a screen-saver mode, wherein based on the mode control, the image is displayed when the computer is in the screen saver mode.

16. The screen controller of claim 9, further comprising:
a mode control that enables the user to specify whether the image is displayed in a normal operating mode, wherein based on the mode control, the image is displayed when the computer is in the normal operating mode.

17. A computing system, comprising:
a computer;
a display;
a wireless transmitter coupled with the computer for transmitting a wireless signal;
a wireless receiver coupled with the display for receiving said wireless signal; and
a screen controller comprising:
a module for selecting a web site by a user having an image associated therewith;
a control that enables the user to specify a time range for accessing the image;
a module for accessing the web site to obtain the image during the time range specified by the user; and
a module for transmitting as the wireless signal a data signal corresponding to the image so that the image is displayed on the display for the user.

18. The computing system of claim 17, wherein the screen controller further comprises:
a control that enables the user to specify a duration time for displaying the image, wherein the image is displayed on the display for the user specified duration of time.

19. The computing system of claim 17, wherein the screen controller further comprises:
a control that enables the user to specify a refresh frequency to for refreshing the image, wherein based on the refresh frequency specified by the user, the web site is accessed to obtain the image.

20. The computing system of claim 17, wherein the display is a thin screen display mountable on a wall.

21. A method for displaying a screen saver on a display of a computer, the method comprising:
providing for a selection of a web site by a user having a real time image associated therewith;
providing a control that enables the user to specify a time range for accessing the image;
during the time range specified by the user, accessing the web site to obtain the image; and
displaying the image on the display as a screen saver for the user.

* * * * *

UNITED STATES PATENT AND TRADEMARK OFFICE
CERTIFICATE OF CORRECTION

PATENT NO. : 7,185,292 B2  Page 1 of 1
APPLICATION NO. : 10/216799
DATED : February 27, 2007
INVENTOR(S) : Maria Pinsky et al.

It is certified that error appears in the above-identified patent and that said Letters Patent is hereby corrected as shown below:

In column 2, line 12, delete "to" before "for".

In column 8, line 60, in Claim 11, delete "to" before "for".

In column 10, line 14, in Claim 19, delete "to" before "for".

Signed and Sealed this

Eleventh Day of November, 2008

JON W. DUDAS
*Director of the United States Patent and Trademark Office*